Figure 1:
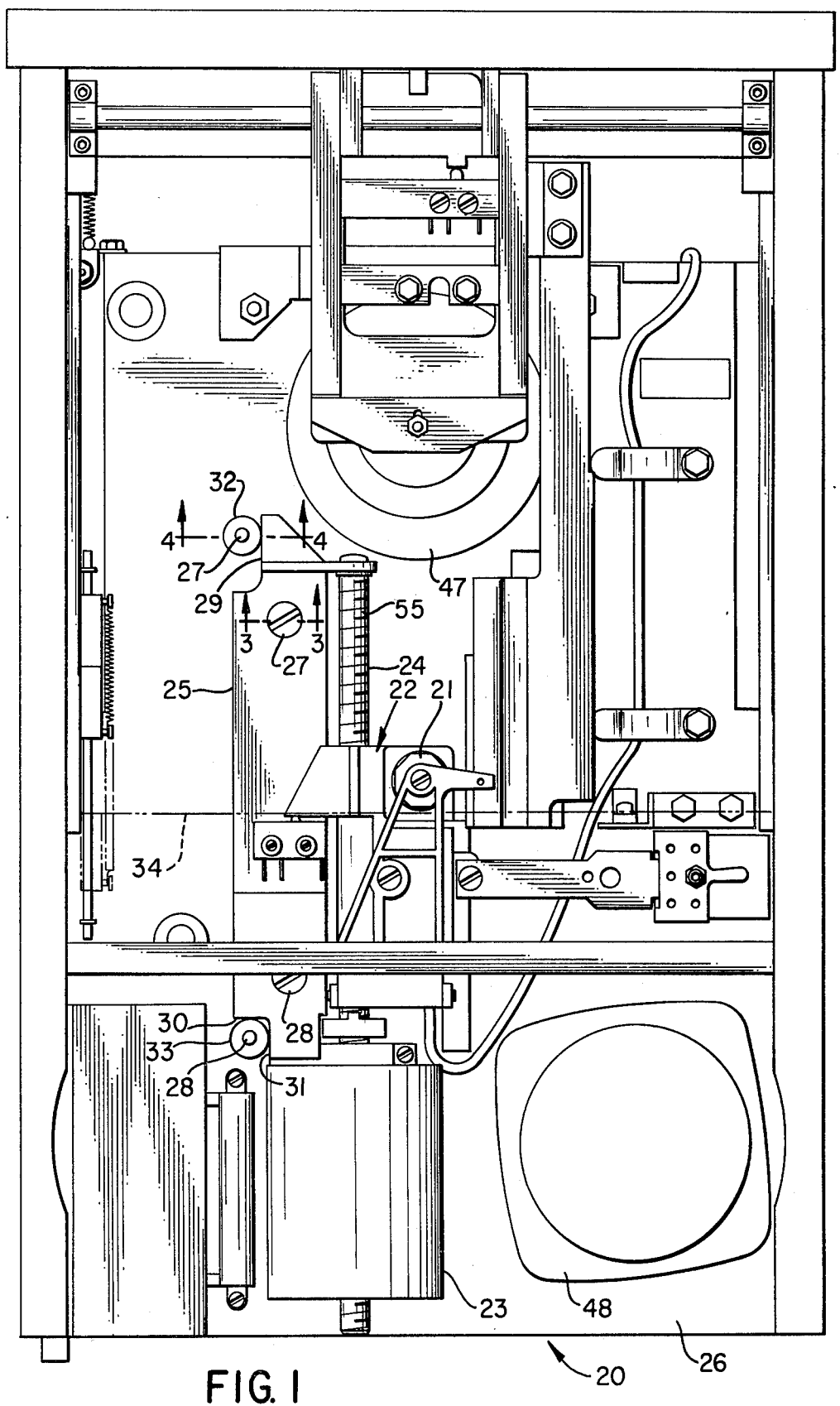

United States Patent [19]

Townsend

[11] 4,139,877
[45] Feb. 13, 1979

[54] MODULAR READ/WRITE HEAD CARRIAGE WITH DRIVE FOR FLOPPY DISK UNITS

[76] Inventor: Robert H. Townsend, Box 100, Oxford, Ark. 72565

[21] Appl. No.: 848,446

[22] Filed: Nov. 4, 1977

[51] Int. Cl.² .................. G11B 21/08; G11B 5/55
[52] U.S. Cl. ................................................ 360/106
[58] Field of Search ................ 360/106; 74/424.8 A

[56] References Cited

U.S. PATENT DOCUMENTS

| 3,669,440 | 6/1972 | Kartasuk et al. | 74/424.8 A |
|---|---|---|---|
| 3,770,905 | 11/1973 | Sperry | 360/106 |

Primary Examiner—Robert S. Tupper
Attorney, Agent, or Firm—Warren H. Kintzinger

[57] ABSTRACT

A Floppy Disk magnetic information storage and retrieval unit with a stepping motor lead screw driving a half-nut of the read/write head carriage. The read/write head carriages used are interchangeable modules and the stepper motor, carriage drive lead screw and a mounting plate are also in the form of interchangeable modules for Floppy Disk units equipped with registration banking button positioning for minimized tolerance variation between interchangeable modular assemblies for simplified reliable field maintainance and lower cost.

17 Claims, 16 Drawing Figures

MODULAR READ/WRITE HEAD CARRIAGE WITH DRIVE FOR FLOPPY DISK UNITS

This invention relates in general to computer information storage and retrieval systems of the Floppy Disk type and, in particular, to a lead screw driven half-nut read/write head carriage drive module and a carriage module with both supplied as interchangeable modules, and to registration banking for minimized disk track tracking tolerance variation between modules alternately installed in Floppy Disk units.

It is important in information storage and retrieval systems of the Floopy Disk type and others that the units be so constructed that cooperating parts be positioned such and maintained in registry so as to achieve and maintain required accuracy standards. Major operational subassemblies, if supplied as interchangeable modules, must have a highly accurate registration system that allows interchangeability while maintaining the required level of position accuracy to insure required track tracking tolerances. Such tracking tolerance repeatability between interchangeable read/write head carriage modules should be such as to allow interchange replacement of failed or defective module units at customer or user location without requiring readjustment and special tools and equipment normally heretofore required in readjusting units upon repair or replacement of parts. Known drives currently in use are factory aligned with a master diskette commonly referred to as a C-E disk, or alignment disk. Through means of special track spacing, or eccentrically written tracks on a master diskette (eccentric relative to the disk drive bore center), or a combination of the two, the track center (of a particular track) is found by zeroing in on the master diskette used as a reference tool. Obviously, errors in recording of the master diskette, degradation due to wear, and environmental factors tend to reduce master diskette accuracy in time even without considering the high level of skill required to ensure desired results in use.

The accuracy requirements for "on track" are such that a very minor positional error can result in the inability to interchange diskettes between drives, and accumulative drift can result in loss of information, since tracks written on a unit and stored for a period of time, during which a shift due to wear has occurred can result in the inability to retrieve that data. Most, if not all, disks drives currently in production use a thread-loading system to take out looseness, or play, between the read/write head carriage and the lead screw of the stepper motor, in those drives that use a stepper motor as a positioner means for the head. The direction of loading is commonly in the axial direction of the lead screw, and the head carriage drive nut engaging threading of the lead screw is of the full envelopment type. The axillary follower nut, commonly used in such preexisting head carriage drives for removing excess play, is also of the full envelopment type. A spring is normally used to bias the two nuts in opposite axial directions in overcoming looseness derived from part tolerances and wear. A failed read/write head or drift due to wear are major problems with preexisting systems not amenable to easy, convenient service on location. Removal of a magnetic head carriage from such units creates a major problem with original alignment destroyed by disassembly.

The Floppy Disk unit presented herein represents a design concept along with an assembly sequence using some special tooling at the factory that establishes and ensures the retention of record track tracking tolerance accuracy, while at the same time, eliminating use of a C-E diskette as a set-up and/or maintenance tool. The present design approach provides a modular system allowing semiskilled or unskilled users, following simple instructions and using commonly available tools, to make repairs on location with assurance of predictably successful results. Inherently, the design reduces component wear factors and extends unit service life, thereby further reducing maintenance and service requirements.

It is therefore a principal object of this invention to provide an improved read/write head carriage drive in magnetic information track storage disk units.

Another object is to provide information storage units structured for minimized maintenance and service requirements.

A further object with such information storage disk units is the provision of interchangeable modular read/write head carriage subassemblies and stepper motor with drive lead screw modules for ease of field service part replacement.

Another object with units using interchangeable modular carriage subassemblies and stepper motor with drive lead screw modules is a factory set controlled registration system ensuring minimized tolerance variation between interchangeable carriage modular assemblies upon unit installation.

Still another object is the reduction of drive system component wear and extended unit life in a unit using a drive thread and nut thread contact where thread wear is balanced and not cumulative in tolerance variation.

Figure 2:
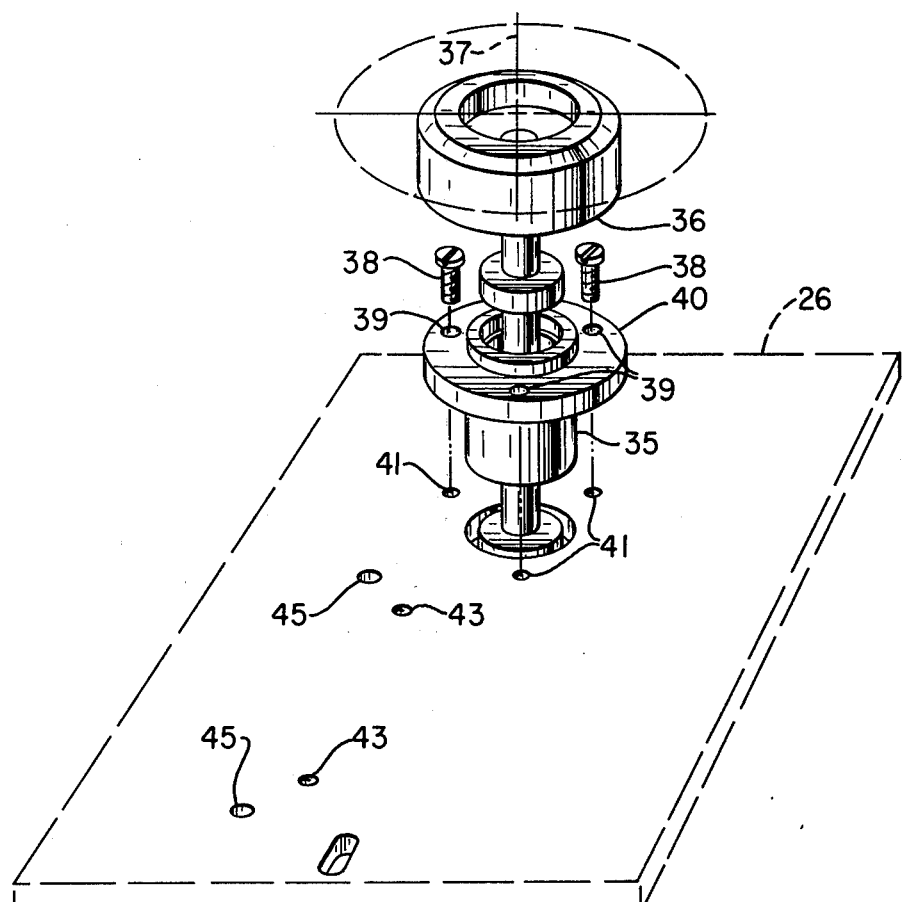
Figure 3:
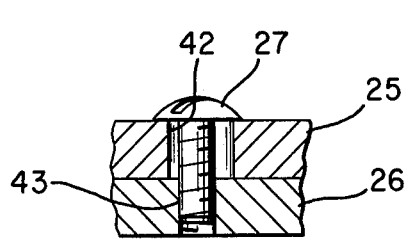
Figure 4:
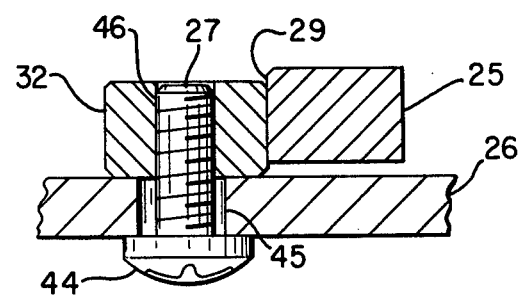
Figure 5:
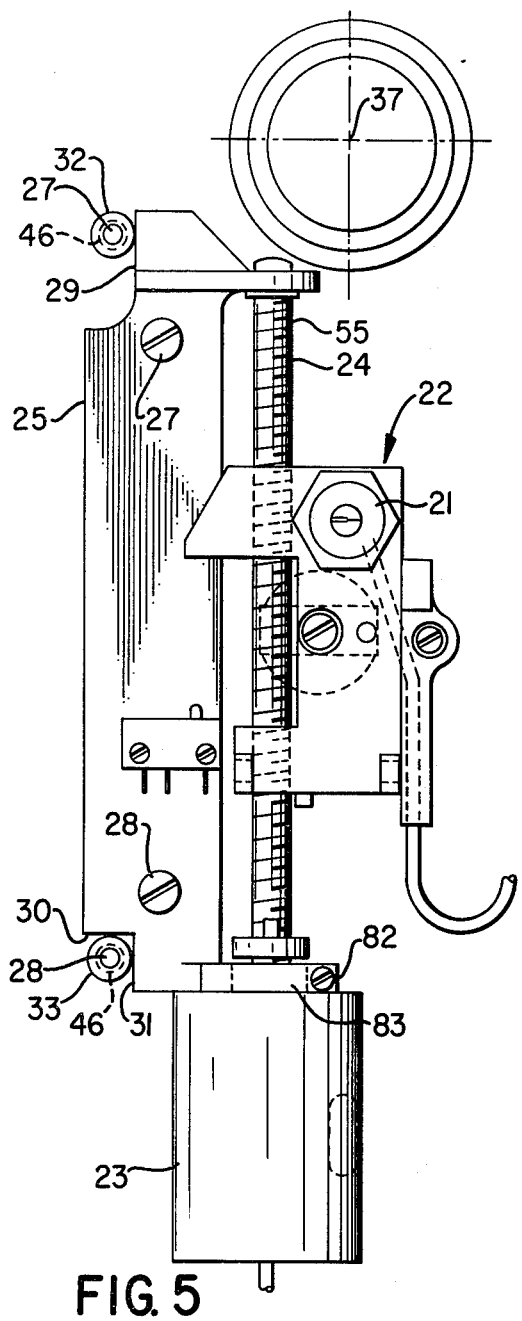
Figure 6:
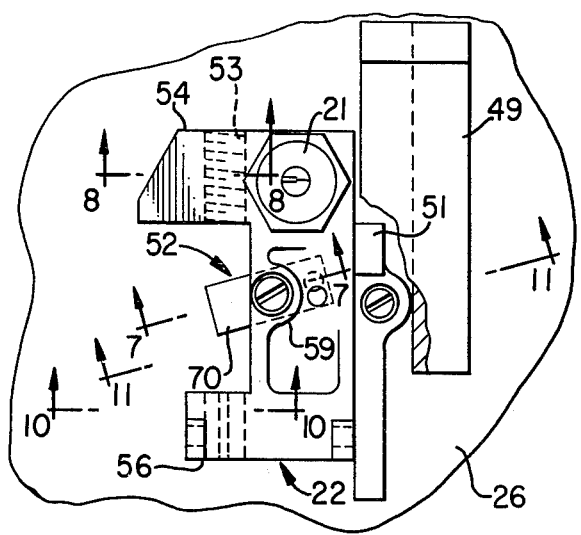
Figure 7:
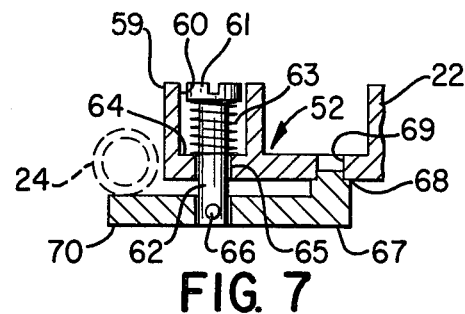
Figure 8:
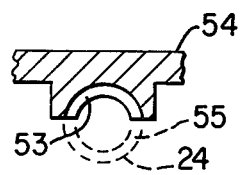
Figure 9:
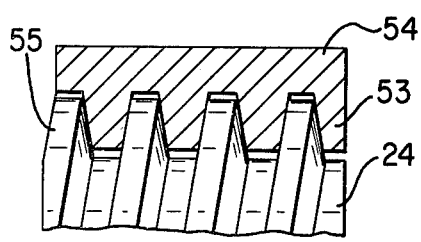
Figure 10:
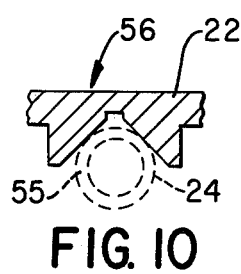
Figure 11:
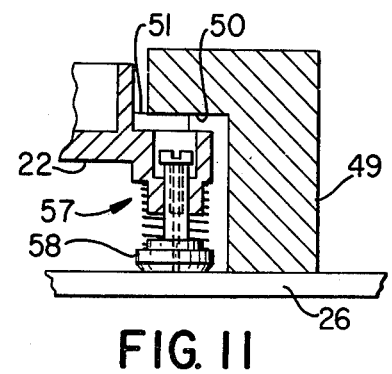
Figure 13:
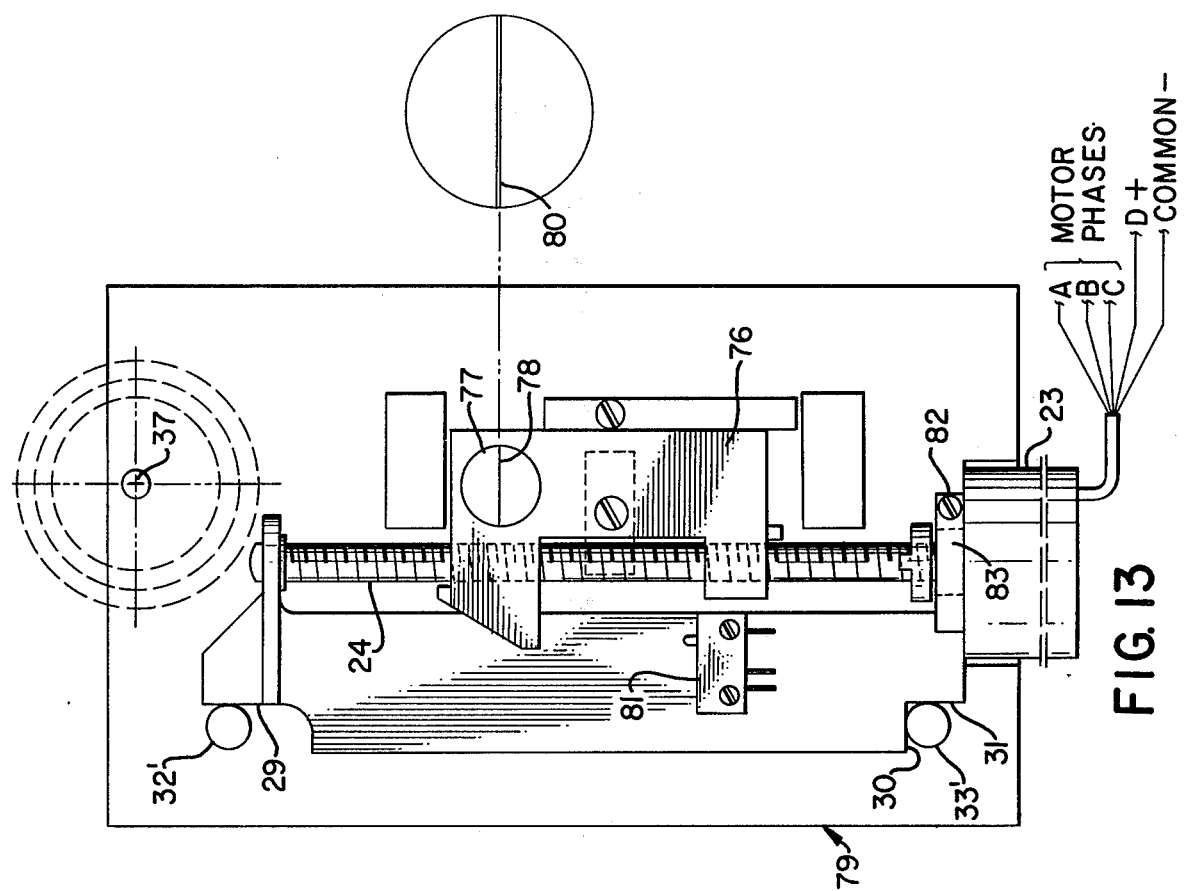
Figure 12:
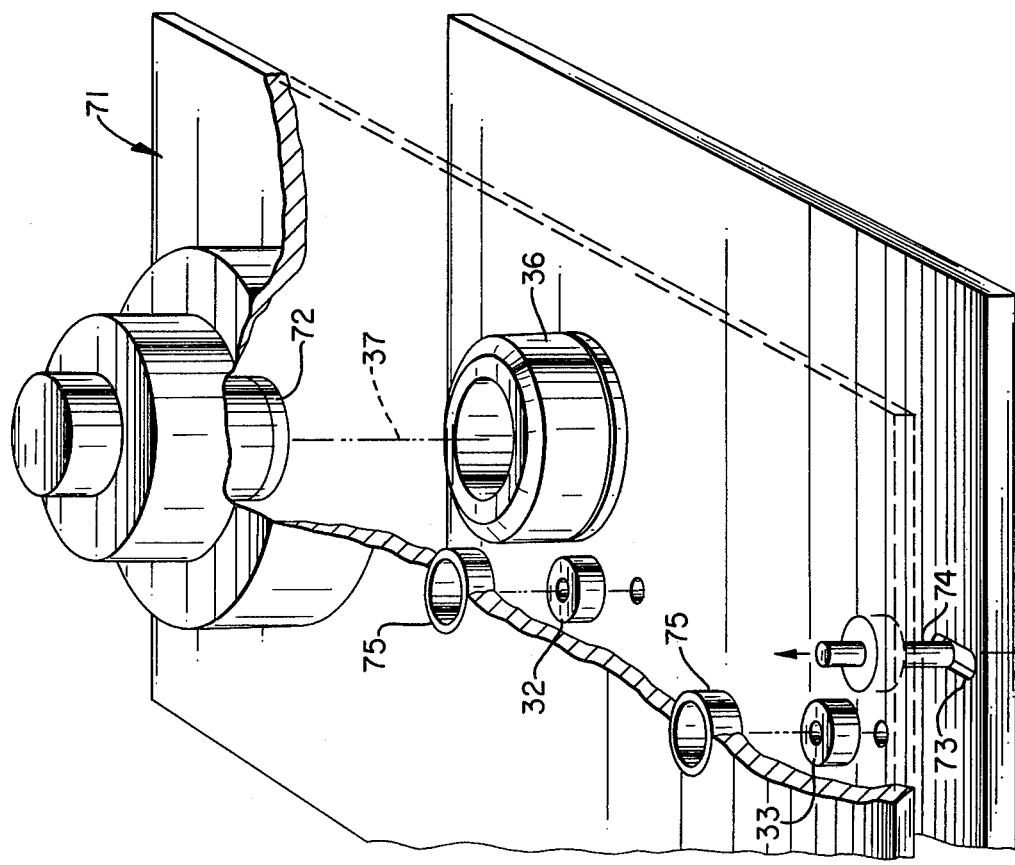
Figure 14:
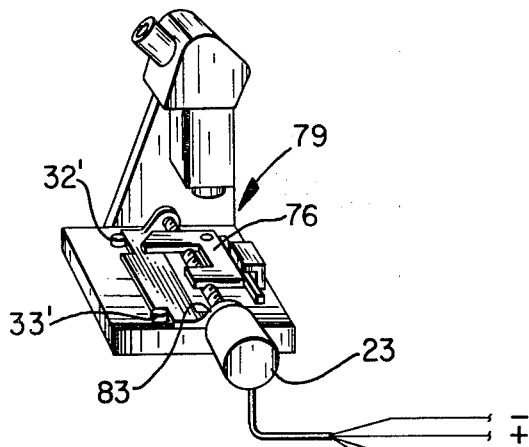
Figure 15:
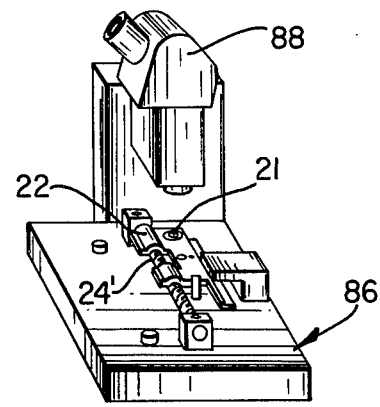
Figure 16:
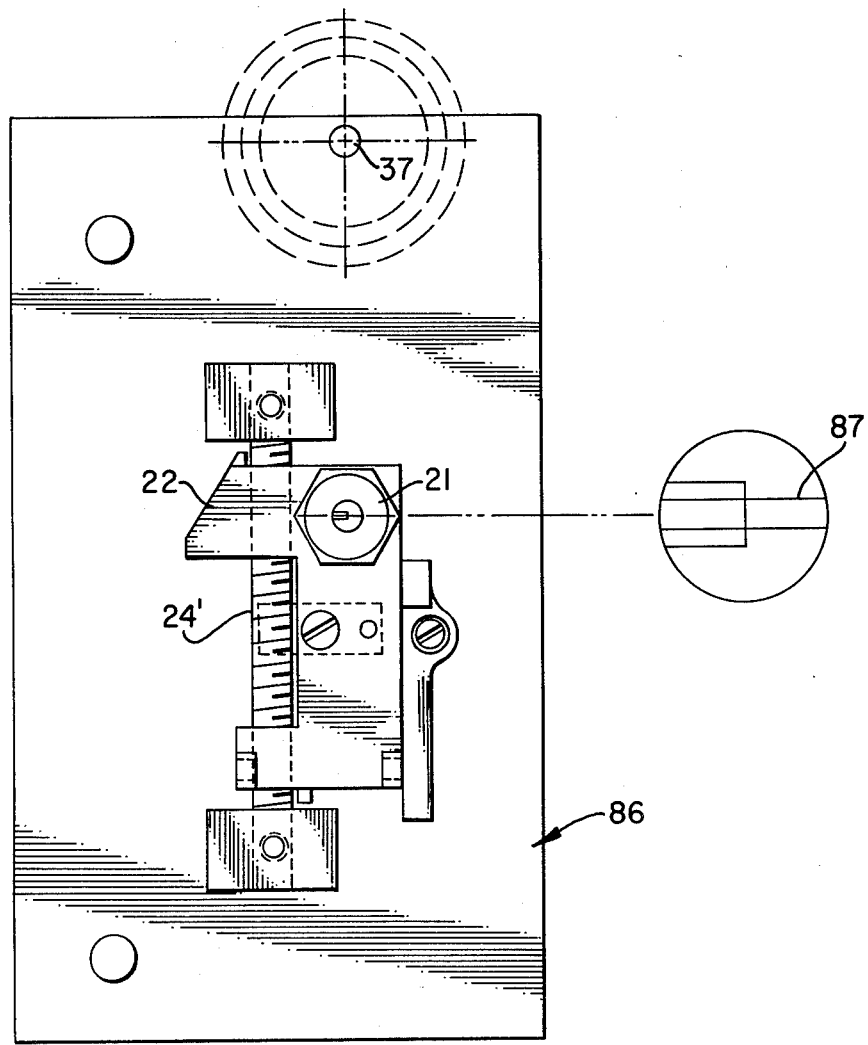

Features of this invention useful in accomplishing the above objects include a modular read/write head carriage assembly and stepper motor with drive lead screw modules that are interchangeable between magnetic information storage Floppy Disk units designed therefor. The stepping motor driven lead screw drives a half-nut in a read/write head carriage wherein thread wear is balanced and does not result in cumulative tolerance variation. These features are provided in modular subassemblies that are useable interchangeably with others of the same modular subassembly in a Floppy Disk unit equipped with registration banking button positioning in the disk unit for minimized tolerance variation occurence between modules alternately installed in the disk unit. There are many advantages attained through use of this modular concept with simplified, reliable, field maintenance and lower costs that enhance sales potential. Advantages presented include customer repair options, and enabling the extension of sales areas to remote locations particularly, with spare module parts sales with units. The configuration is ideal as a leased equipment line with long on track life and short time (five minute) repair by replacement of most significant elements. The design eliminates a requirement for two mold pulls in a head carriage drive part engaging the lead screw, lowers assembly cost, and with balanced part wear and improved conformation to lead screw threads, some initial tolerance relaxation is permitted. Part complexity is decreased with accuarcy of setting controlled at the factory. Alignment disks and oscilloscopes for alignment such as have been used with prior units are no longer required. Repair equipment requirements are reduced and spare drive exchange pipeline requirements are substantially eliminated. Service training requirements are much less severe and customer relations improved by fast efficient repair. A specific embodiment representing what is presently regarded as the best mode of carrying out the invention is illustrated in the accompanying drawings:

In the drawings:

FIG. 1 represents a top plan view of a Floppy Disk unit equipped with the modular read/write head carriage and drive registration indexed in place with registrational banking button positioning;

FIG. 2, a perspective partial view showing disk drive base plate detail and an exploded showing of disk drive hub and hub mounting detail;

FIG. 3, a partial sectioned view taken substantially along line 3—3 of FIG. 1 showing mounting screw and mounting detail of the module base plate on the disk drive base plate;

FIG. 4, a partial sectioned view taken substantially along line 4—4 of FIG. 1 showing banking button mounting detail on the disk drive base plate;

FIG. 5, a detailed top plan view of the modular read/write head carriage and registration positioning detail of module mounting on the disc drive base plate;

FIG. 6, a top plan view of the read/write head carriage and the associated platen structure;

FIG. 7, a cross sectioned view along line 7—7 of FIG. 6 showing detail of a spring bias structure in the carriage;

FIG. 8, a cross section along line 8—8 of FIG. 6 showing detail of the carriage drive half-nut;

FIG. 9, a partial showing of the carriage drive half-nut, in section, in full radially biased engagement with threads of the lead screw;

FIG. 10, a cross section along line 10—10 of FIG. 6 showing a "V" shaped carriage alignment stabilizer that rests on the lead screw;

FIG. 11, a cross section along line 11—11 of FIG. 6 showing a resilient spring base riding pad structure of the carriage;

FIG. 12, an exploded perspective of registration banking button locator tool and disk drive base with a disk drive hub;

FIG. 13, a top plan view of a disk drive module on an alignment fixture and a carriage tool;

FIG. 14, a microscope observation tool structure used with the alignment fixture and carriage tool of FIG. 13; and, FIGS. 15 and 16, microscope and fixture tool structure for the positioning of read/write heads on carriages.

Referring to the drawings: The Floppy Disk unit 20 shown in top plan view in FIG. 1 includes a modular read/write head 21 carriage 22 subassembly along with a stepping motor 23 and drive lead screw 24 module with a mounting base plate 25. The module base plate 25 is mounted on the disk drive base plate 26 by mounting screws 27 and 28. Module base plate 25 is mounted with accurately machined surfaces 29 and 30 and 31 in registered banking contact with registration banking buttons 32 and 33 respectively. Referring also to FIG. 2, a partial perspective showing of some disk drive base plate 26 detail and including an exploded showing of some of the Floppy Disk 34 drive detail, the bearing housing 35, that rotatably mounts disk drive hub structure 36 on a very precise rotational axis of rotation 37, is solidly fixed to plate 26 by screws 38 extending through openings 39 in housing flange 40 into threaded openings 41 in plate 26. As detailed in FIG. 3, mounting screws 27 and 28 extend through enlarged openings 42 in module base plate 25 to threaded mounting engagement in threaded openings 43 in plate 26. Further, as shown in FIG. 4, the screws 44 that fasten registration banking buttons 32 and 33 to disk drive base plate 26 are tightened in place with their heads below plate 26, shanks extending through enlarged clearance openings 45 in plate 26 to tightened threaded engagement in threaded openings 46 of buttons 32 and 33.

The Floppy Disk 34 structure, indicated in phantom in FIG. 1, is a rotatable flexible magnetic circular disk contained within a protective rectangular enclosure havings openings for drive clamping of the disk by a top drive collet 47 on the top of disk drive hub structure 36, for index sensor position reading of the disk, and for operational contact of the read/write head 21 with the disk. Disk drive motor 48 is drive connected to the disk drive hub structure 36 below disk drive base plate 26 (some drive detail not shown).

Further detail of the read/write head carriage 22, relation to the lead screw 24, and a platen structure 49 are shown in FIG. 6. The platen structure 49 is mounted on the disk drive base 26 (mounting detail not shown) and has a platen guide surface 50 along which a platen bearing surface 51 of the carriage 22 slides with back and forth driven movement of the carriage 22. FIG. 7, a cross section taken substantially along line 7—7 in FIG. 6, shows a carriage latch assembly 52 bearing against the underside of lead screw 24 to reactively resiliently hold the half-nut teeth 53 of the half-nut structure 54, of the carriage 22 in drive engagement with lead screw teeth 55 as illustrated in cross section in FIG. 8 taken substantially along 8—8 in FIG. 6. This holds the lead screw teeth 55 in balanced engagement with teeth 53 of half-nut 54 as shown in FIG. 9 eliminating any requirement of axial tooth loading for wear take up and resulting tolerance outage with cumulative tooth wear. The half-nut 54 is structured with teeth 53 extending through an arc a little less than 180° in order to avoid tooth wedge binding lock with teeth 55 of lead screw 24, and to permit detachment and replacement with disengage of the carriage 22 from lead screw 24. Another read/write carriage section shown in FIG. 10, a cross section taken substantially along line 10—10 in FIG. 6, shows an alignment stabilizer 56 in the form of a "V" shaped portion of the carriage that contacts the outer diameter of the lead screw teeth 55 to help maintain carriage alignment with the drive screw 24. FIG. 11, a cross section view taken substantially along line 11, in FIG. 6, shows additional carriage 22 structural detail with a resilient spring structure 57 resiliently biasing a riding pad 58 down on the top of disk drive base 26 along which it rides with movement of the carriage 22 and biasing the carriage upward so that carriage bearing surface 51 slides along the platen guide surface 50 with back and forth driven movement of the carriage 22.

Referring again to the carriage and latch assembly 52 detailed in FIGS. 5, 6, and 7, the read/write head carriage 22 is provided with a carriage latch assembly 52 mounting boss 59 having an opening 60 containing the grooved head 61 of latch pin 62 and a compression spring 63 resiliently confined about the shank of latch pin 62, between the pin head 61 and the bottom 64 of opening 60. The latch pin 62 extends through opening 65 in the bottom 64 of opening 60 to a through pin 66 connection with latch arm 67. The carriage latch assembly 52 mounting boss 59 is located longitudinally, in the direction of carriage travel as driven by lead screw 24, in the mid region of the carriage 22 and to one side of the axis of lead screw 24 when the carriage and lead screw are in operational engagement. Latch arm 67 is formed with a shouldered boss projection 68 that is received in opening 69 of head carriage 22 with the shoulder of projection 68 seated on the bottom of base 26 when latch arm 67 is in the carriage 22 to lead screw 24 latched state such as shown in FIGS. 5 and 7. In the locked state, the forward portion 70 of latch arm 67 extends to bottom engagement resiliently against the tops of lead screw teeth 55 as reiliently urged by spring 63 through latch pin 62 and lever reaction of arm boss projection 68 on disk drive base 26. In disassembly of the carriage 22 from operational assembly with the drive module in a unit, a screw driver may be used to depress the latch pin 62 down disengaging projection 68 from opening 69 and rotating the latch arm 67 to clear from engagement with lead screw 55 with the carriage 22 assembly then removeable as a module from the unit.

While there may have been some effort toward modular build-up in Floppy Disk units heretofore, the tolerance build-up, unless extremely stringent and therefore expensive, has been such as to block the machining of location points with sufficient accuracy to ensure satisfactory results. Thus, an assembly approach to factory standards using a new modular design with an established orderly priority of steps eliminates certain tolerance allowances in achieving required accuracy. In the new design ground accuracy stock, such as stainless steel, is used for the registration banking buttons 32 and 33. While not illustrated, please note that registration banking buttons such as buttons 32 and 33 may also be utilized for positioning the index sensor element structure that is related to the beginning and end of track on the disk and clocked by the electronics.

Referring again to FIGS. 1, 2 and 5, the disk drive hub or bore is the location starting point for the operating elements with the center of rotation of the disk the basic coordinate starting point. In the improved Floppy Disk unit 20, in order to eliminate the drive hub housing to base plane tolerance, in case of a separate housing, or overly tight tolerance of bearing bore to associated elements from consideration where the bearing housing is integral with the base, the drive hub is made the reference point of origin and assembled first. If a separate bore housing structure is used, the attachment to the disk drive base should be of a permanent nature. Bearings, shaft, and drive hub should be assembled and checked for runout within stated limits before proceeding with further assembly since upon attachment of the drive hub to the base plane, the center of the coordinate system is established.

With the disk drive center established, other associated and prepositioned holes, clearance or threaded, may be used as fastener points. A button locator tool 71, such as shown in FIG. 12, is used at this stage of unit assembly to aid in establishing the registration banking button points of location for the entire family of Floppy Disk units to be built and establishes a reliable base for desired accuracy and reliability in modular exchange. These registration points also serve as inspection and set-up points for the machining of the module base plate 25, cementing of the read/write head 21 into carriage 22, and for calibrating associated assembly tools. The button positioning tool 71 is much like a drill jig equipped with a tapered conical section 72 to center on the drive hub bore center line 37. A radial reference point relative to the hub bore center line 37 may be established by a center locator slot 73 in disk drive base 26 engaged by locator pin 74 mounted in button positioning tool 71. Alternately, a locator pin 74, or its equivalent, could engage a locator side of an opening provided in base 26 to accomodate a portion of the housing of stepping motor 23. Locator pin 74 may be in the form of a retracting pin used to engage center locator slot 73, and the pin 74 may be tapered to achieve full registry in the slot 73. Registry banking button locators for buttons 32 and 33 installation on assembly are hardened steel bushings 75 such as normally used in drill jigs and are a higly accurate close fit to the buttons 32 and 33. With the button positioning tool 71 mated to the base 25 with the disk drive structure partially assembled thereon, the buttons 32 and 33 are drawn to the base 25 with screws 27 and 28 from beneath and through clearance openings 45 in the base 25 with bushings 75 acting as locating guides for proper registered positioning of the buttons 32 and 33. Upon completion of button 32 and 33 attachment on the base 25, the tool 71 is removed for use in attaching buttons 32 and 33 to the base 25 of another unit 20. Thus, with closely toleranced master tool 71 and buttons 32 and 33, all bases are substantially identical with respect to button location but not hole 45 location with ample hole 45 clearance provided to permit proper registered positioning of the buttons 32 and 33.

Referring at this point also to FIG. 13 for drive module subassembly detail, the registration banking surfaces 29, 30 and 31 of the module base plate 25 in registration contact with buttons 32 and 33 in a unit, locate set of the axis of travel for the read/write head carriage 22. Since these master reference surfaces are common to all drive module units and are referred back to the track position selected as a reference, they are instrumental in achieving uniform machining and in the inspection of parts and tooling. Features of stepper motors 23 are important in Floppy Disk units 20 in that they have discrete step positions with regard to the rotating drive lead screw 24, and the motors 23 have a fixed step sequence and the electronic control wiring therefor. In set-up, a desired lead screw 24 position is selected with zone of screw 24 length combined with a preselected motor phase energized to lock and with the motor 23 rotated to the desired angular location. A driven element (i.e., a read/write carriage 22) drive locked to the lead screw 24 may be driven longitudinally along the axis of screw 24 to any desired position. For the purpose of prealignment, a reference carriage tool 76 is provided for reference set-up and for observation in set-up and checking using a model head carriage with the read/write head replaced by a suitable target 77 for observation. Target 77 represents the center line of some selected track position (commonly track 38 of 76 tracks of a standard Floppy Disk is used) and may, as shown in FIG. 13, consist of a single microscopicly visible line 78 scribed on a glass target plate lighted from underneath for enhanced visibility. A microscope observation tool 79 as shown in FIG. 14 is used having a fixed viewing reticle having a matching line 80 that with proper setting of the carriage drive is superimposed over the line 78 on the reference tool 76. This stepping motor 23 and lead screw 24 setting is accomplished by locating the reference tool 76 on the lead screw active zone, energizing the stepper motor selected phase, and rotating the motor to position exactly. Note again that the registration banking points and surfaces positioning the tool 76 are identical with relation to the drive bore center 37 on Floppy Disk units 20, and relate to the same selected track position.

In relation to the same registration banking points and surfaces, a limit switch 81 and limit stop structure may be set with their placement and operational range being derived from carriage configuration and factors of function. In addition to the mounting of screws 27 and 28, of module base 25 to disk drive base 26, screw 82 and module motor 23 mount clamp 83 lock the rotational position of the stepper motor 23 after adjustment. The tool of FIGS. 13 and 14 is used with the drive module base 25 held in registry position against registry banking buttons 32′ and 33′ while motor position adjustments are made and after adjustment the stepping motor drive module assembly is removed from the tool and placed in stock as a modular assembly fully interchangeable in the improved Floppy Disk units 20 with other like drive module assemblies.

Referring again to the carriage 22 and the latch assembly 52, constant resilient pressure is provided by spring 63 for constant drive containment of half-nut 54 on lead screw 24 to eliminate looseness due to tolerances, accomodate wear, and provide a latched indication. The radially applied engagement force of half-nut 54 onto the lead screw 24 forces both sides of the nut teeth 53 into engagement rather than only one side of the teeth as when a longitudinal bias is applied between the teeth parallel to the longitudinal axis of the lead screw 24. The same overall length of half-nut engagement to the lead screw is as effective with both side surfaces of the nut tooth profile applied as with the case of full envelopment, with the added advantage that drift, due to wear, is no longer any significant contributor to off-track misalignment. Radial wear is a factor affecting head penetration and the load pad 58 of resilient spring structure 57 helps ensure compliance while such counteractive structure is not provided in prior units with axial drive screw system wear to help maintain on-track with as result drift being progressive.

A limit switch 81 contact surface 84 is provided on read/write head carriage 22, and resilient spring structure 57 is provided as a rotational stabilizer giving radial stabilization control around the axis of lead screw 24. In normal stand-by the force imposed by a non-energized solenoid 85 retracts the head 21 from engagement with the normally rotating disk. Upon solenoid 85 energization for information seek, the follower pin forces the carriage 22 against the platen 49 under surface 50 and the load pad (not shown) bears down on the disk to ensure proper disk bearing force on the read/write head 21.

Positioning placement of heads 21 on carriages 22 is accomplished with microscope fixture tool assembly 86, such as shown in FIGS. 15 and 16, with a fixed lead screw section 24′ to which the carriage 22 is engaged during positioning and cementing in place of heads 21 on carriages 22. The screw section 24′ is position referenced to the same selected track position as is the stepper motor 23 drive module base 25. Thus, when head placement is achieved, both track position and azimuth attitude are set in proper registered reference to the drive hub center 37. A special fixed reticle 87 is used in the microscope 88 to gain both objectives simultaneously, and after cementing of the head 21 in place, the head carriage 22 is placed in stock as an interchangeable module.

Whereas this invention is herein described with respect to a preferred embodiment, it should be realized that various changes may be made without departing from essential contributions to the art made by the teachings hereof.

I claim:

1. In a random access information storage system employing magnetic disks with recording tracks and an information transferring head: a moveable carriage mounting said information transferring head; stepping motor drive means; lead screw means driven by said stepping motor drive means; and a nut segment mounted on said moveable carriage; said nut segment having teeth that mate teeth of said lead screw means and engageable with said lead screw means when said carriage is mounted in place for operation in said random access information storage system; and resilient bias structure means on said moveable carriage in position to maintain said nut segment in drive engagement with said lead screw means when said moveable carriage is installed in place for operation; said moveable carriage with said information transferring head being in the form of an interchangeable stepper motor module for removal and replacement without distrubing the setting of the lead screw means and stepping motor drive means; wherein said lead screw means and said stepping motor drive means are assembled in preset relation in said interchangeable stepper motor modules including mounting member means; alignment registration means structured for precise predetermined position setting of said interchangeable stepper motor modules in random access information storage system units; the magnetic disks with recording tracks are mounted for rotation on a hub structure for driven rotation about a stable center axis of rotation; said alignment registration means includes registration structure presenting alignment points in said system; and a distance from the hub structure center axis of rotation location point means; said mounting member means has a plurality of accurate registration surfaces positioned to be in registration alignment contact with respective points of said points; and, wherein said registration structure presenting alignment points are line contacts of two registration banking buttons accurately located on a mounting plate of said system relative to the hub structure axis of rotation.

2. The random access information storage system of claim 1, wherein the arc of said nut segment teeth is less than 180° for ease of engagement and disengagement.

3. The random access information storage system of claim 1, wherein said location point means is a line contact of a registration banking button.

4. The random access information storage system of claim 3, wherein said location point means is on a registration banking button also having an alignment point; and with the location point means and the alignment point on a banking button being line contacts substantially ninety degrees apart.

5. The random access information storage system of claim 1, wherein said banking buttons are internally threaded and mounted on said mounting plate of said system by screws extended through clearance openings in said mounting plate from the opposite side of the plate from the banking buttons.

6. The random access information storage system of claim 4, wherein said mounting member means is a module base plate of said interchangeable stepper motor module having accurately machined edge surfaces for bearing contact with banking button line contacts when an interchangeable stepper motor module is installed in a system unit.

7. The random access information storage system of claim 6, wherein said module base plate is fastened to said mounting plate by screws extended through enlarged clearance openings in the module base plate to threaded openings in the mounting plate.

8. The random access information storage system of claim 5, wherein and method of assembly include said banking buttons are accurately located on said mounting plate by a button locating tool having a centering portion for centering engagement with said hub structure; second locating means for said button locating tool; and bushings that are an accurate snug fit on said banking buttons holding said buttons in proper predetermined position as they are tightened in place on the mounting plate.

9. The random access information storage system of claim 7, wherein said interchangeable stepper motor module base plate is held in position with said accurately machined surfaces of the base plate in registry contact with respective banking button line contacts.

10. The random access information storage system of claim 2, wherein said nut segment and said lead screw means have mating teeth with teeth equally sloped on opposite sides of the teeth for end thrust balance between the nut segment and said lead screw means and equalized tooth wear.

11. The random access information storage system of claim 10, wherein said resilient bias structure means is pivotably mounted on said moveable carriage for pivotal movement into latched position in bilateral lead screw thread side wall contact to maintain said nut segment in positive drive engagement with said lead screw means for the operational state, and pivotal movement to an unlatched position for detachment of the nut segment from positive drive engagement with said lead screw means and allowing complete removal of the module without disturbing modular presettings.

12. The random access information storage system of claim 11, wherein said resilient bias structure means includes a latch pin having a pin head mounted on said moveable carriage; a resiliently compressible coil spring on said latch pin between said pin head and a surface on said moveable carriage; and a latch arm connected to said latch pin by through pin means, having a force reaction end and a lead screw engaging end.

13. The random access information storage system of claim 12, wherein the force reaction end of said latch arm includes a shouldered boss projection receivable in an opening of said carriage to lock said latch arm in the lead screw engaging position.

14. The random access information storage system of claim 13, wherein said pin head is slotted for engagement by a screw driver, and said latch pin may be pressed down disengaging said shouldered boss projection from the opening in said carriage and rotating the latch arm to a lead screw disengagement position.

15. The random access information storage system of claim 6, wherein a master tool base with registry alignment and position banking buttons is used as a registry setting tool; said stepping motor drive means includes a stepping motor having discrete step positions and a fixed step sequence; selection of a desired lead screw position in set-up with a zone of lead screw length combined with preselected motor phase energization to lock, and rotation of the motor with lead screw to the desired angular location; and motor mount rotation position lock means then tightened to the position lock state.

16. The random access information storage system of claim 15, wherein a reference carriage tool is used with a suitable target for reference set-up observation, setting and checking; and a microscope observation tool having a fixed viewing reticle matching line is used for reference setting of a line on the target of the carriage tool during position setting of the stepping motor and lead screw.

17. The random access information storage system of claim 2, wherein system assembly is accomplished with, a microscope fixture tool assembly including a fixed lead screw section on a tool base; engagement of said moveable carriage having said nut segment with said fixed lead screw section; and cementing said information transfer head in place on the carriage to proper track position and azimuth attitude, and with a fixed reticle used in the microscope of said microscope fixture tool.

* * * * *